US006856273B1

(12) United States Patent
Bognar

(10) Patent No.: US 6,856,273 B1
(45) Date of Patent: Feb. 15, 2005

(54) MINIATURE RADIO-ACOUSTIC SOUNDING SYSTEM FOR LOW ALTITUDE WIND AND PRECIPITATION MEASUREMENTS

(76) Inventor: John A. Bognar, 6515 W. 96th Ave., Westminster, CO (US) 80021

( * ) Notice: Subject to any disclaimer, the term of this patent is extended or adjusted under 35 U.S.C. 154(b) by 47 days.

(21) Appl. No.: 10/350,771

(22) Filed: Jan. 24, 2003

Related U.S. Application Data

(60) Provisional application No. 60/351,865, filed on Jan. 25, 2002.

(51) Int. Cl.[7] .......................... G01S 13/00; G01F 13/00; G01P 5/00
(52) U.S. Cl. .................................. 342/26 D; 73/170.13
(58) Field of Search ............................ 342/26 A–26 D, 342/26, 52, 460, 462; 367/89, 90; 73/170.11, 170.13, 170.17, 861.01, 861.25, 861.26, 861.27

(56) References Cited

U.S. PATENT DOCUMENTS

| | | | |
|---|---|---|---|
| 4,006,477 A * | 2/1977 | Yost et al. ...................... 342/51 |
| 4,222,265 A * | 9/1980 | Ravussin ...................... 374/119 |
| 4,351,188 A | 9/1982 | Fukushima et al. ............ 73/189 |
| 4,573,352 A * | 3/1986 | Hurtig et al. ............. 73/170.13 |
| 4,761,650 A | 8/1988 | Masuda et al. ................ 342/26 |
| 5,122,805 A | 6/1992 | Peterman et al. .............. 342/26 |
| 5,125,268 A * | 6/1992 | Caron ...................... 73/170.17 |
| 5,544,525 A | 8/1996 | Peterman et al. ......... 73/170.13 |
| 6,070,461 A | 6/2000 | Gjessing et al. .......... 73/170.15 |

OTHER PUBLICATIONS

Stephens, Graeme L., "Remote Sensing of the Lower Atmosphere: An Introduction," pp. 403–419, Oxford University Press: New York, 1994.

Houze, Robert A., Jr., "Cloud Dynamics," pp. 110–117, Academic Press: San Diego, California, 1993.

Atmospheric Research Pty Ltd., "The ARPL RASS," online at http://www.a–research.com.au/rass.html, accessed Dec. 10, 2002 (first accessed May 24, 2001).

Brown, William, et al., "Introduction to the McGill Profiler," online at http://www.radar.mcgill.ca/profiler.html, Aug., 2000, accessed Dec. 10, 2002 (first accessed May 24, 2001).

Fabry, Frederic, "The RASS addition to the profiler," online at http://www.radar.mcgill.ca/rass.html, Aug., 2000, accessed Dec. 10, 2002 (first accessed May 24, 2001).

Geerts, B., "Radio acoustic sounding system," online at http://www.weather.uwyo.edu/~geerts/cwx/notes/chap15/rass.html, accessed Dec. 10, 2002 (first accessed May 24, 2001).

* cited by examiner

Primary Examiner—Bernarr E. Gregory
Assistant Examiner—Brian Andrea
(74) Attorney, Agent, or Firm—Sheridan Ross P.C.

(57) ABSTRACT

The present invention is directed to a radio-acoustic sounding system for providing wind measurements at altitudes of 100 meters or less. Wind measurements are obtained by transmitting a pulse of audio frequency energy through one or more volumes corresponding to the coverage area of one or more radio frequency transceivers. The frequency of the audio pulse is selected to have a wavelength that is one-half the wavelength of the electromagnetic energy transmitted by the antenna or antennas. By monitoring a return radio frequency signal at selected times following the transmission of the audio pulse, wind data is obtained at selected altitudes. Wind speed and direction can be obtained by observing the Doppler frequency shift of return radio frequency signals, or by observing the amplitude of the return radio frequency signals. In accordance with an embodiment of the present invention, precipitation measurements may be made by transmitting a radio frequency signal at the same radio frequency as is used in connection with wind measurements, and observing return radio frequency signals.

43 Claims, 8 Drawing Sheets

MINIATURE RADIO-ACOUSTIC SOUNDING SYSTEM FOR LOW ALTITUDE WIND AND PRECIPITATION MEASUREMENTS

CROSS REFERENCE TO RELATED APPLICATIONS

Priority is claimed from U.S. Provisional Patent Application Ser. No. 60/351,865, filed Jan. 25, 2002, entitled "MINIATURE RADIO-ACOUSTIC SOUNDING SYSTEM FOR LOW ALTITUDE WIND AND PRECIPITATION MEASUREMENTS," the entire disclosure of which is incorporated herein by reference in its entirety.

FIELD OF THE INVENTION

The present invention is directed to a radio-acoustic sounding system for retrieving vertical profiles of the wind and precipitation data. In particular, the present invention relates to a miniature continuous wave radio-acoustic sounding system for obtaining low altitude wind measurements and precipitation measurements as part of a surface-based meteorological station.

BACKGROUND OF THE INVENTION

Surface-based meteorological stations may be used in connection with monitoring a variety of environmental conditions. In connection with surface-based meteorological stations, it is often desirable to measure the speed and direction of the wind. However, surface-based meteorological stations are often unable to take accurate measurements using mechanical anemometers. In particular, unless an anemometer is located in a flat, open area where the wind can freely pass over the surface, it is not possible to obtain accurate wind data. As a result, few backyard or other small scale weather stations can accurately measure the wind due to the effects of surrounding houses and trees.

Electronic devices for remotely measuring atmospheric conditions using radio and/or audio frequencies are available. Such devices have been designed to take measurements at large distances (e.g., 200 meters or greater) above the surface. As a result, relatively long wavelength, high powered radars and/or loudspeakers are required. Because of the large altitudes from which such devices are designed to obtain data, large antennas or arrays of antennas must be used in order to transmit the radio frequency signal in a narrow beam. Similarly, large loudspeakers or arrays of loudspeakers are often required. Accordingly, remote sensing systems are typically large, expensive, and consume large amounts of power.

Sound detection and ranging (SODAR) systems use sound waves for remotely measuring the wind. In a SODAR system, acoustic pulses are sent upward and the Doppler shift and acoustic energy reflected back to the device by the atmosphere are measured. In a typical implementation, at least three acoustic beam paths are used, although the accuracy of data can be increased by using a larger number of beam paths. SODAR systems are typically used to measure winds at altitudes of up to hundreds of meters. The altitude at which reflection occurs is determined by the time required for the reflected energy to be received. SODAR systems rely on small scale turbulence to reflect the acoustic energy back to the device. Because naturally occurring turbulence is required to reflect the sound energy, SODAR systems can be limited in the altitudes from which data is obtained.

Wind profiling radar systems have also been utilized to remotely sense the speed and direction of the wind. A wind profiling radar depends on refractive irregularities provided by eddies in the atmosphere to scatter the radar beam, thereby creating a return signal. By measuring the Doppler shift observed in connection with returned signals, the velocity of the wind can be determined. In a typical wind profiler radar, measurements are made in five directions using radar beams having a beamwidth of less than 10 degrees. Wind profiler radars are capable of obtaining wind data at heights of many kilometers. However, in order to obtain such range, wavelengths of about 33–75 cm, and correspondingly large antennas and power supplies, are required. In addition, as with SODAR systems, wind profiling radar can be limited in the altitudes from which data is obtained.

Systems combining the use of acoustic and radio frequency signals, known as radio-acoustic sounding systems (RASS), have been used to obtain vertical profiles of temperature over the location of the system. To obtain a temperature profile, a range of audio frequencies with wavelengths about one-half that of the radar are transmitted into the atmosphere. The exact wavelength of the sound frequency is a function of the air temperature that the sound wave is passing through. When the wavelength of the sound is exactly one-half the radar wavelength, Bragg scattering of the transmitted radar pulse will occur from that segment of the sound pulse. Therefore, by transmitting a range of audio frequencies and observing the frequencies at which a return is generated to the radar transceiver, the temperature of the atmosphere at selected altitudes can be obtained. Such systems are effective at providing temperature profiles up to altitudes of several kilometers. In order to achieve accurate measurements at such altitudes, pencil beam radars (e.g., having a beamwidth of less than 10°) are used. Radio-acoustic sounding systems are often combined with wind profiler radar. Because of the long ranges at which such devices operate, large loud speakers, and large radar antennas capable of producing very narrow beams are required.

Systems that use a combination of audio frequencies and radio frequencies to determine wind speed and direction have also been developed. In such systems, a sound pulse, which will be blown from its initial trajectory by wind in the atmosphere, and an associated directional radar are aimed so that they intersect at a location in the atmosphere from which data is to be obtained. The sound pulse has a wavelength that is one-half the wavelength of the radio frequency signal, so that the sound pulse reflects the radio frequency signal. The Doppler frequency of the returned signal is used to compute wind velocity, and directional measurements can be made based on the direction in which the radar is aimed. Such a system is described in U.S. Pat. No. 4,761,650 to Masuda et al. ("Masuda"), the disclosure of which is hereby incorporated herein by reference in its entirety. In an exemplary embodiment, Masuda describes a system that generates sound waves having a frequency of 70–120 Hz at a power of 200 W, and that includes a radar having a frequency of 46.5 MHz, a power of 1 MW, and a beamwidth of 3–6°. Because such systems require large acoustic and radar frequency transducers, and because they require large amounts of power, they are not suitable for small-scale installations.

Another system using a combination of audio and radio frequencies to measure wind is described in U.S. Pat. No. 4,351,188 to Fukushima et al. ("Fukushima"), the disclosure of which is hereby incorporated herein by reference in its entirety. The Fukushima reference describes measuring wind by directing a sound pulse vertically, and using a multiplicity of antennas to detect the point to which continuously generated radio frequency waves are reflected by the sound pulse. Accordingly, the system of Fukushima requires a lattice of receiving antennas laid out over a large area. In an exemplary embodiment, Fukushima describes a system using acoustic signals having frequencies from 680 to 6800 Hz and a sound pressure level of 130 to 150 dB, radio frequency signals having a frequency of from 300 to 3000 MHz, and a wavelength of from 0.1 to 1.0 m transmitted from aperture antennas having a diameter of 0.2 to 2 m. For a system capable of detecting wind at altitudes of up to 1000 m and at speeds of up to 5 m/sec, Fukushima describes a lattice of receiving antennas distributed over a square area measuring 30 m on each side.

Systems for remotely measuring precipitation parameters are also available. However, the accurate detection of precipitation requires much shorter radio frequency wavelengths than those typically used by radar systems for measuring other atmospheric conditions. In particular, devices for measuring wind or temperature have used relatively long wavelengths to enable sensing at high altitudes, and are therefore ineffective at measuring precipitation. Accordingly, a device for measuring precipitation must typically be provided separately from devices used to detect the wind or the air temperature remotely.

Accordingly, it would be desirable to provide a system for remotely sensing the wind that is relatively compact and inexpensive. In addition, it would be desirable to provide such a system that was capable of reliable operation in a wide range of weather conditions. Furthermore, it would be desirable to provide a system capable of remotely sensing the wind that was also capable of measuring precipitation without requiring additional hardware.

SUMMARY OF THE INVENTION

The present invention is directed to solving these and other problems and disadvantages of the prior art. The present invention provides a system for taking measurements of the wind at low altitudes (e.g., 3–50 m) using relatively compact, low power equipment. Embodiments of the present invention are also capable of providing precipitation measurements. Generally, according to the present invention, a radio frequency signal (or electromagnetic energy) and a physical wave, such as an acoustic or audio signal having a wavelength that is approximately one-half the wavelength of the radio frequency signal are generated, and transmitted upwardly. In particular, the frequency of the audio signal, and thus the wavelength of the physical wave created by that signal, is selected so that Bragg scattering will occur when the radio frequency signal is incident upon the acoustic signal. As used herein, an acoustic or audio signal includes audio signals having frequencies from about 20 Hz to 26 kHz. The audio signal is pulsed, so that the radio frequency signal may be reflected back to the device from a selected altitude. As the audio signal travels upward, its trajectory will be altered by wind in the atmosphere. Accordingly, the amplitude and/or Doppler shift of the return radio frequency signal may be analyzed to determine the magnitude of the wind at the selected altitude.

In accordance with an embodiment of the present invention, an audio signal pulse is transmitted into the atmosphere vertically along a path that coincides with or is parallel to the axis of a radio frequency beam. The frequency of the audio frequency signal is selected so that the wavelength of the signal is about one-half the wavelength of the radio frequency signal. To determine the appropriate frequency for the audio signal, the speed of sound is calculated from the ambient temperature. The humidity may also be monitored in connection with determining the audio frequency to generate. Wind present in the atmosphere over the site of the sensor will blow the transmitted audio pulse away from its initial trajectory. This can be detected as a Doppler shift in the return radio frequency signal, or as a change in the amplitude of a return radio frequency signal, as portions of the sound pulse are blown further into or out of the volume illuminated by the radio frequency beam. The altitude of the audio signal pulse is determined from the amount of time elapsed between transmission of the audio signal pulse and reception of a radio frequency return signal. Accordingly, a system in accordance with the present invention utilizing a single acoustic or audio transducer and a single radar transceiver is capable of measuring the speed of the wind at various heights above the sensor.

In accordance with another embodiment of the present invention, at least three antennas for producing beams of electromagnetic energy that are in close proximity to one another or that partially overlap are provided. According to such an embodiment, an audio signal pulse is transmitted along a trajectory that causes the pulse to travel through at least portions of each of the beams of electromagnetic energy. The frequency of the audio signal is selected so that the wavelength of that signal is one-half or about one-half the wavelength of the electromagnetic energy. By monitoring the return signal reflected by the audio signal pulse with respect to each of the electromagnetic beams sequentially, the speed and direction of the wind above the sensor site can be determined. The altitude from which a return signal is reflected can be determined based on the amount of time elapsed between transmission of the audio signal pulse and reception of the return radio frequency signal.

In accordance with still other embodiments of the present invention, additional audio transducers and/or radar antennas may be provided to increase the accuracy of measurements and/or to allow measurements to be made in high winds. In accordance with an embodiment of the present invention, the radio frequency signal or signals has a frequency of 7 GHz or more, and the frequency of the audio pulse is from about 18 kHz to about 25 kHz.

In accordance with other embodiments of the present invention, a vertical radio frequency channel may be used in connection with precipitation measurements. According to such an embodiment, a radio frequency signal is generated, and return signals reflected from precipitation in the atmosphere are monitored. The frequency of the radio frequency signal is the same as that used in connection with wind measurements. Furthermore, such measurements can be made even while audio signal pulses are being transmitted in connection with wind measurements, by appropriate filtering of the return signal.

Additional advantages of the present invention will become readily apparent from the following description, particularly when taken together with the accompanying drawings.

DETAILED DESCRIPTION

Figure 1:
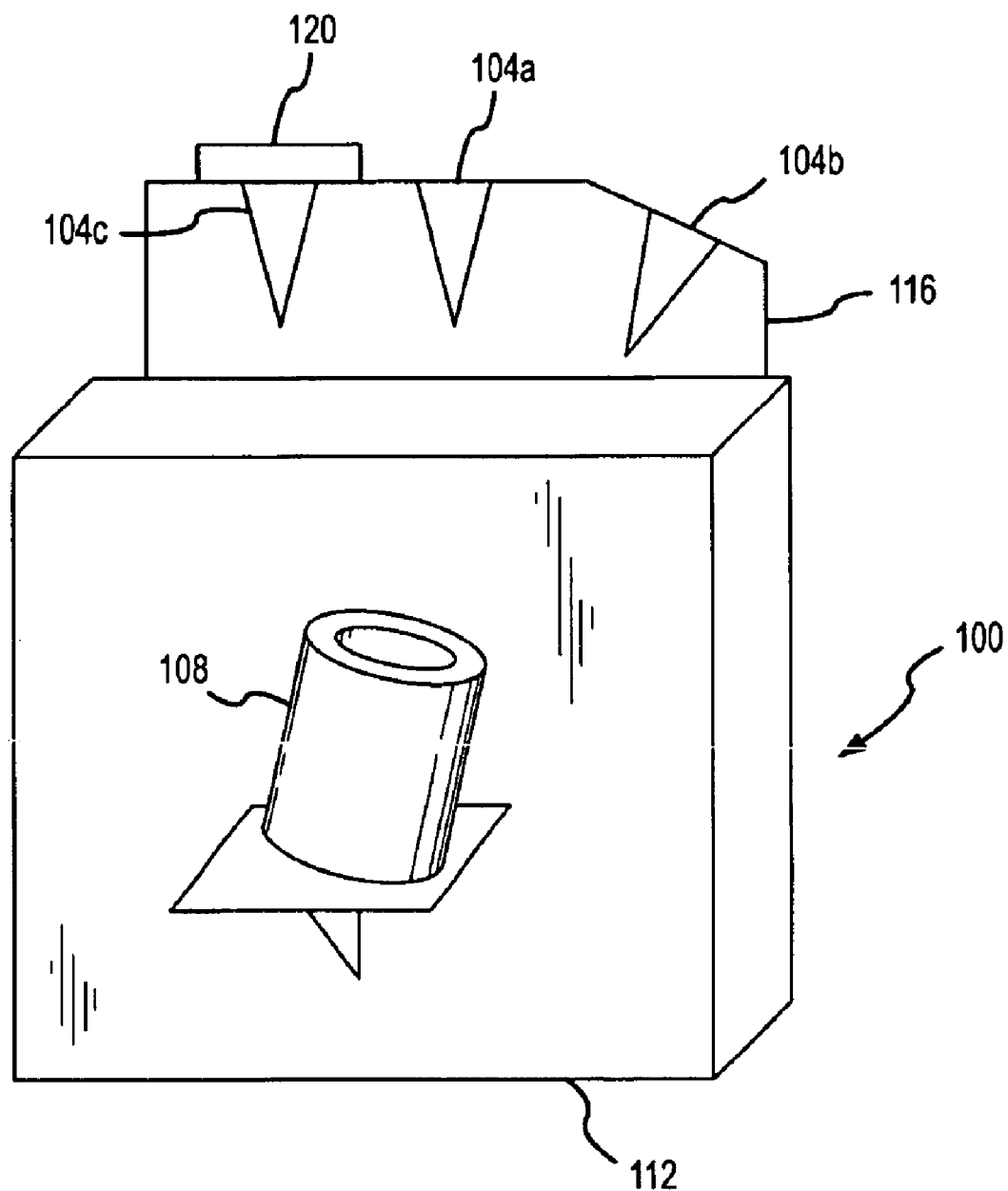
FIG. 1 depicts a radio-acoustic sounding system unit in accordance with an embodiment of the present invention.

With reference now to FIG. 1, a radio-acoustic sounding system for low altitude wind and precipitation measurements 100 in accordance with an embodiment of the present invention is depicted. In general, the system 100 includes one or more radio frequency antennas 104, and an audio frequency transducer 108, also referred to herein as an acoustic or audio transducer 108. In addition, the system 100 may include an enclosure 112 for housing various components of the system 100.

As shown in FIG. 1, the antennas 104 may be formed on a single printed circuit board (PCB) 116. The orientations of the antennas 104 may vary, to provide the desired coverage, as described more fully below. In addition, a metallic plate 120 may be provided in combination with one or more of the antennas 104 to deflect the beam of an associated antenna 104 in a direction that is transverse to the plane of the printed circuit board 116.

In general, the antennas 104 are designed to transmit relatively broad beams (e.g., about 30°) of electromagnetic energy. The antennas 104 are further designed to transmit electromagnetic energy having relatively short wavelengths (e.g., less than 4 cm).

In accordance with an embodiment of the present invention, the antennas 104 are end fire antennas. As a further example, the antennas 104 may comprise tapered slot antennas. Such antennas can be formed directly on the surface of a printed circuit board 116 while providing antenna beams in the desired orientations. For example, as shown in FIG. 1, a tapered slot antenna 104a may be oriented to provide an antenna beam that is substantially vertical, a second antenna 104b may be oriented to provide an antenna beam that is deflected in the y plane, and a third antenna 104c may be provided in combination with a deflector plate 120 to provide an antenna beam that is deflected in the x plane. End fire antennas, such as tapered slot antennas formed on a printed circuit board, present a very thin cross section when viewed from above. This geometry provides a compact unit, and helps to prevent the accumulation of meaningful quantities of snow or other debris over the antennas 104.

The audio transducer 108 is configured to transmit pulses of audio frequency energy along a path that intersects at least portions of the volumes defined by the beams of the antennas 104. Accordingly, the audio transducer 108 may be angled in both the x and the y planes, as will be described in greater detail below. In order to provide a pulse that can function as a reflector for radio frequency energy transmitted by an antenna 104, the frequency of an energy pulse transmitted by the audio frequency transducer 108 is selected so that the wavelength of the pulse is one-half or about one-half the wavelength of the energy transmitted by the antenna 104. Because the wavelengths of audio frequencies depend on factors such as temperature and humidity, the required frequency will vary. Accordingly, the audio transducer 108 is preferably capable of transmitting audio frequencies over a range of frequencies.

The enclosure 112 may provide a structure for maintaining the orientation of the antennas 104 relative to the audio transducer 108. In addition, the enclosure 112 may provide a protected space for housing various electronic components associated with the system 100. For example, processing and amplification circuitry, as will be described in greater detail below, may be positioned within the enclosure 112. In addition, a power supply, including a battery, may be positioned within the enclosure 112, providing a system 100 that may be conveniently deployed in locations at which a source of external power cannot be easily obtained. Such an embodiment also provides a system 100 that is easily portable. The enclosure 112 may additionally include a radome component to provide protection from the elements for the antennas 104.

Figure 2:
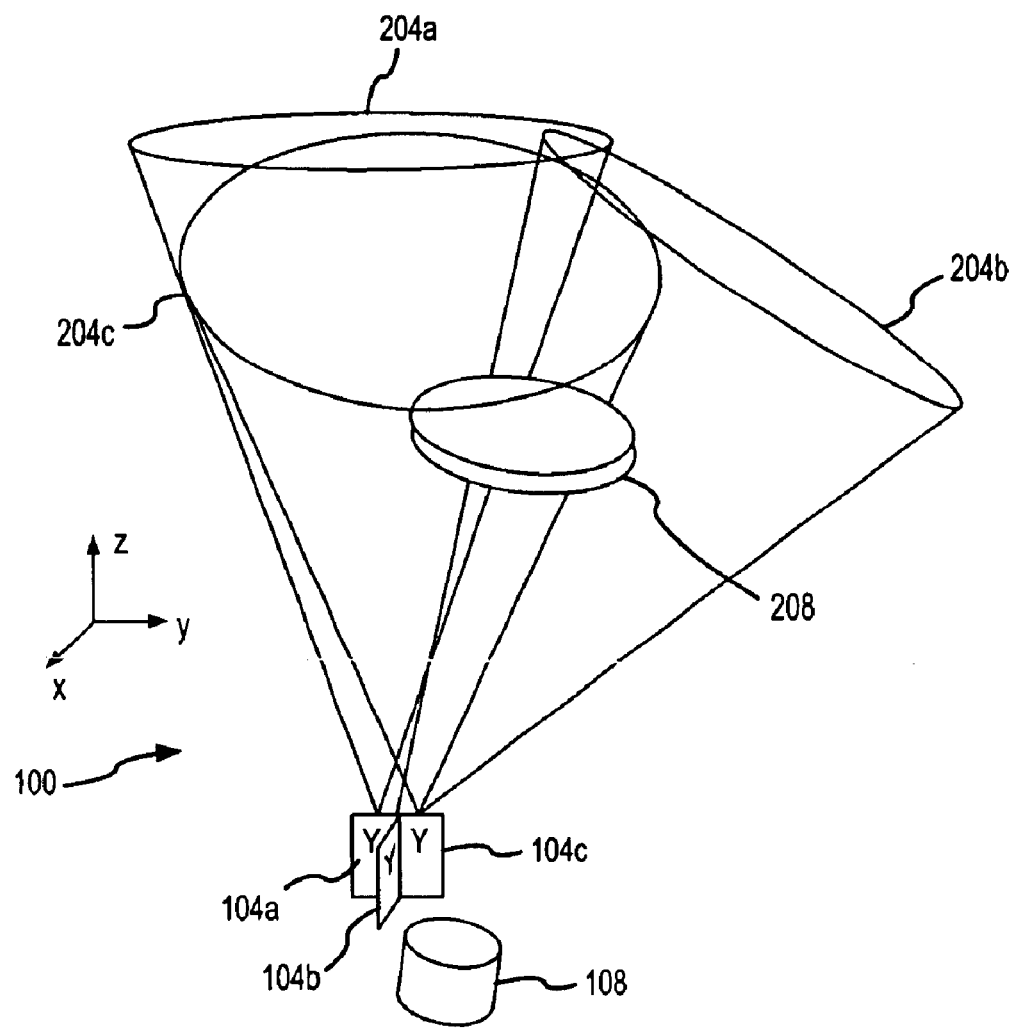
FIG. 2 schematically depicts the relationship of components of a radio-acoustic sounding system in accordance with an embodiment of the present invention.

With reference now to FIG. 2, the beam patterns of radio frequency energy 204 transmitted by the antennas 104 are illustrated in relationship to one another. In addition, the relationship of the beam patterns 204 to the path traveled by an audio pulse of energy 208 produced by the audio frequency transducer 108 is illustrated. As shown in FIG. 2, one beam of radio frequency energy 204a produced by an antenna 104a of the system 100 is oriented vertically (i.e. the (x,y) pair beam deflection is (0°, 0°)). A second of the radio frequency energy beams 204b may be oriented at an angle. For example, the nominal (x,y) pair beam deflection for the second beam 204b may be (0°, 15°). With reference again to FIG. 1, a deflection in the y plane may be obtained by orienting the second antenna 104b at an angle with respect to the vertical antenna 104a. A third beam of radio frequency energy 204c may be oriented at an angle in the x plane. For example, the nominal (x,y) pair beam deflection for the third beam 104c may be (15°, 0°). Deflection of the beam 204c in the x plane may be accomplished by providing a deflection mechanism, such as a metallic plate 120 (see FIG. 1).

As illustrated in FIG. 2, each beam 204 may provide a relatively wide beam (e.g., about 30°). In general, the beams 204 have a beamwidth equal to or greater than about 30°, to provide accurate wind measurements at altitudes of 3–100 meters. In addition, as shown in FIG. 2, the beams 204 of a system 100 have beamwidths and are orientated such that they illuminate volumes that are closely spaced from one another or that partially overlap. This relationship allows a pulse of audio frequency energy 208 to be transmitted that will travel through at least portions of each of the volumes defined by the beams 204.

The orientation of the audio transducer 108 is such that, in the absence of external influences, such as wind, an equal area of the audio frequency pulse will be within each volume at a given instant in time as the audio frequency pulse 208 travels upward. Accordingly, using the example antenna beam deflections described above, the audio transducer may be oriented so that its nominal (x,y) orientation is (7.5°, 7.5°).

The relative orientations of the antennas 104 are shown in FIG. 2 in a configuration that positions the antennas 104 in different planes. Although such a configuration may be used to provide the illustrated beam patterns 204, it should be appreciated that the configuration in FIG. 1 is also suitable for producing the illustrated beam patterns 204 shown in FIG. 2.

Figure 3A:
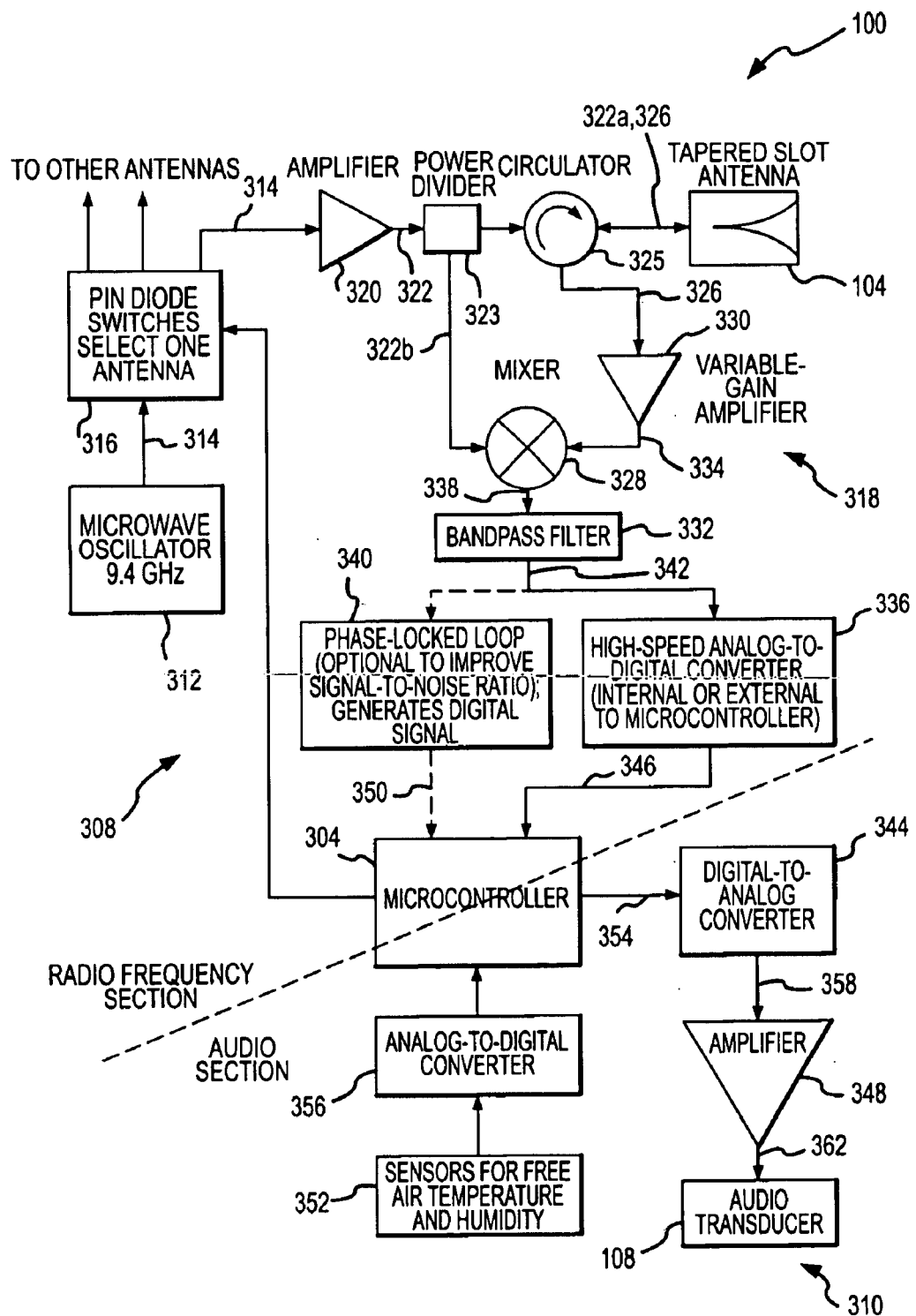
FIG. 3A is a functional block diagram depicting components of a radio-acoustic sounding system in accordance with an embodiment of the present invention.
Figure 3B:
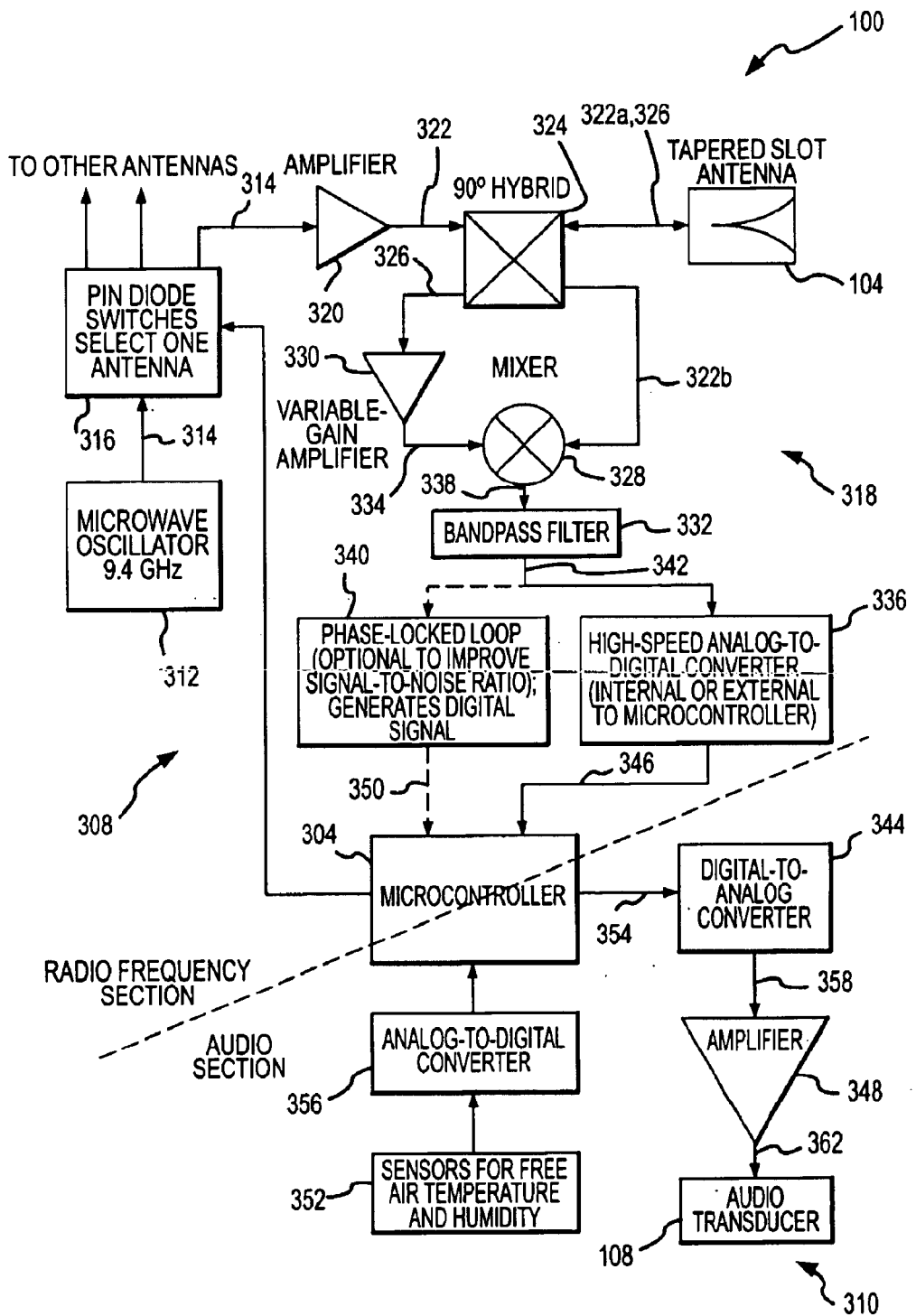
FIG. 3B is a functional block diagram depicting components of a radio-acoustic sounding system in accordance with another embodiment of the present invention.
Figure 3C:
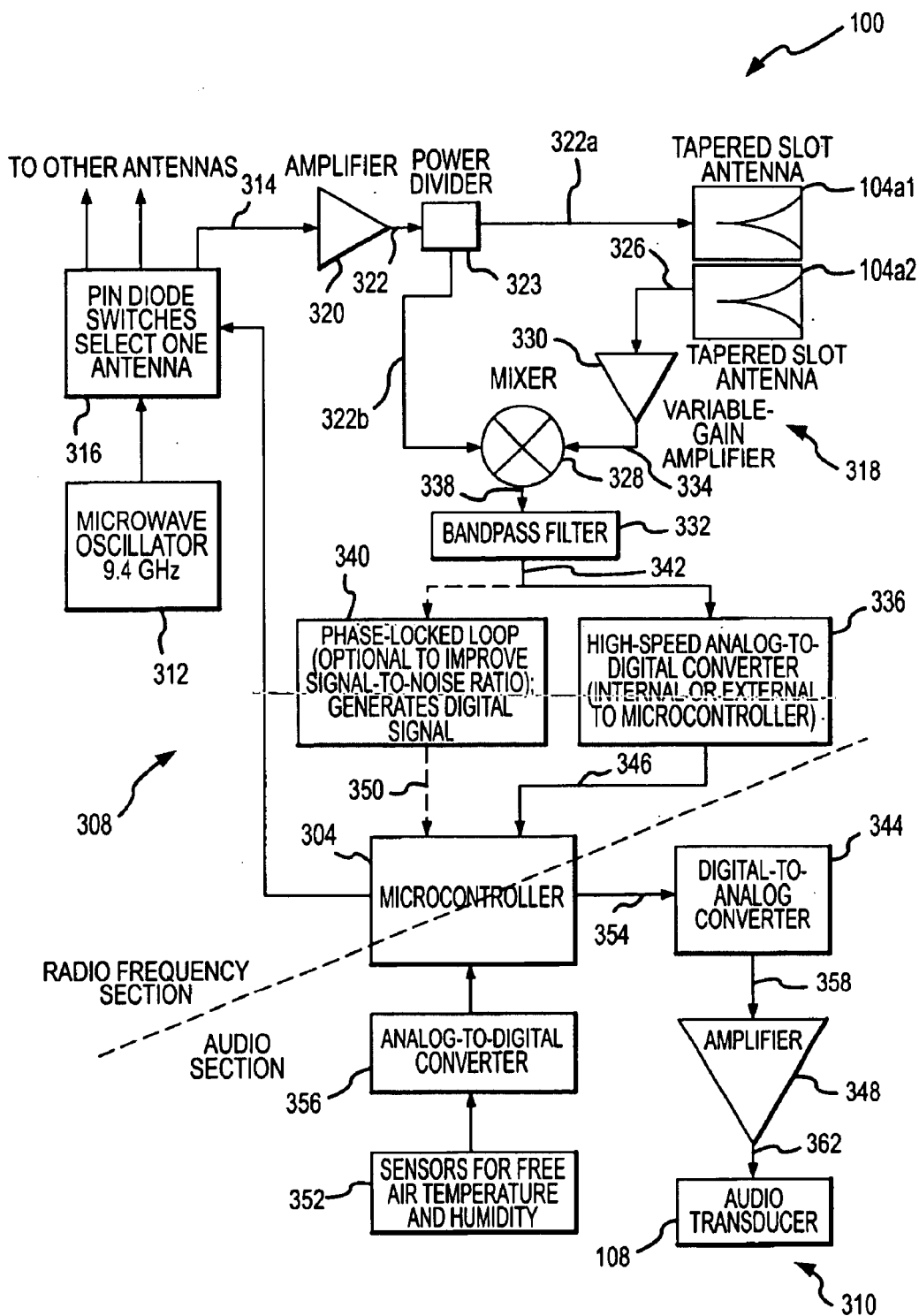
FIG. 3C is a functional block diagram depicting components of a radio-acoustic sounding system in accordance with still another embodiment of the present invention.

With reference now to FIGS. 3A, 3B and 3C, the various components of a radio-acoustic sounding system 100 in accordance with embodiments of the present invention are illustrated in block diagram form. The components include a microcontroller 304 for controlling and coordinating the various components, as will be described in greater detail below. The microcontroller 304 may conveniently be implemented as a microcontroller having a processor section and a memory section for storing operating code and temporary data. However, the invention is not limited to such an embodiment. For example, the microcontroller 304 may be implemented using, for example, a separate processor, memory and long term data storage. The microcontroller 304 is interconnected to a radio frequency section 308 and an audio section 310 of the system 100.

The radio frequency section 308 generally functions to transmit and receive radio frequency signals as directed by the microcontroller 304. The radio frequency section 308 includes a microwave oscillator 312. In general, the microwave oscillator 312 generates the radio frequency signal 314 that is provided to a selected transceiver 318 for transmission by a corresponding antenna 104. In accordance with an embodiment of the present invention, the oscillator 312 provides a signal having a frequency of 9.4 GHz. In order to select a transceiver 318 for transmission of the radio frequency signal, PIN diode switches 316 may be used. The operation of the PIN diode switches 316 is controlled by the microcontroller 304. Accordingly, the microcontroller 304 may directly control the radar transceiver 318 in operation at any moment in time.

In general, the number of transceivers 318 provided as part of a system 100 corresponds to the number of beams 204 of electromagnetic energy used by the system. Each transceiver 318 may include a number of components, such as various amplifiers (e.g., amplifiers 320 and 330), transmission components (e.g. a power divider 323 and circulator 325, or a 90° hybrid 324), transducers (e.g. antenna 104), mixers (e.g., mixer 328), filters (e.g., bandpass filter 332), analog to digital converters (e.g. high speed analog to digital converter 336), and/or phase-locked loops (e.g., phase-locked loop 340). The radio frequency signal 314 is provided from the PIN diode switches 316 to a radio frequency amplifier 320 associated with the selected transceiver 318. The amplified radio frequency signal 322 is then provided to a power divider 323 (see FIGS. 3A and 3C) or to a 90° hybrid 324 (see FIG. 3B). The power divider 323 of the embodiment illustrated in FIG. 3A splits the amplified radio frequency signal 322 into a first portion 322a provided to the antenna 104 by a circulator 325 and a second portion 322b provided to a mixer 328. In the embodiment illustrated in FIG. 3B, the 90° hybrid 324 splits the amplified radio frequency signal 322 into a first portion 322a provided to the antenna 104 and a second portion 322b provided to a mixer 328. In the embodiment illustrated in FIG. 3C, the power divider 323 splits the amplified radio frequency signal 322 into a first portion 322a provided to a transmission antenna 104 (e.g. antenna 104a1) and a second portion 322b provided to a mixer 328. In any of the embodiments depicted in FIGS. 3A, 3B and 3C, the portion of the amplified radio frequency signal 322a provided to the antenna 104 (and in particular the transmission antenna 104a1 for the embodiment of FIG. 3C), is then transmitted by the antenna 104. For example, where a transceiver 318 associated with the first antenna 104a is selected by the PIN diode switches 316, the radio frequency signal 322b is transmitted by antenna 104a (or antenna 104a1 in FIG. 3C) to form beam 204a (see FIG. 2 and FIGS. 3A, 3B or 3C).

As can be appreciated, each antenna 104 of a system 100 in accordance with the embodiment illustrated in FIGS. 3A and 3B, in addition to transmitting radio frequency signals, also functions to receive radio frequency signals, and in particular radio frequency signals originating from within the beam of the antenna 104. Accordingly, each antenna 104 in the embodiments of FIGS. 3A and 3B functions to receive return signals that occur when a transmitted radio frequency signal is reflected back to the antenna 104, for example by a pulse of audio frequency energy 208 having a wavelength that is one-half or about one-half the wavelength of the transmitted radio frequency energy, or from precipitation. In the embodiment illustrated in FIG. 3A, a return radio frequency signal 326 received at an antenna 104 is passed through the associated circulator 325 to a variable gain amplifier 330. In the embodiment illustrated in FIG. 3B, a return radio frequency signal 326 received at an antenna 104 is passed to the associated hybrid 324, and provided to a variable gain amplifier 330. It is also possible to provide separate transmit and receive antennae 104, as shown in FIG. 3C. In particular, a transmit antenna 104 (illustrated as antenna 104a1 in FIG. 3C) may be used to transmit the first portion of the radio frequency signal 322a provided by the power divider 323, and a receive antenna 104 (illustrated as antenna 104a2 in FIG. 3C) may be used to receive a return radio frequency signal 326 that is provided directly to the variable gain amplifier 330. With respect to any of the embodiments illustrated in FIGS. 3A, 3B and 3C, the amplified return signal 334 is then provided to the mixer 328, where it is mixed with the amplified radio frequency signal 322b.

As a result of the mixing operation, a signal comprising the Doppler frequency resulting from the interaction of the transmitted radio frequency energy 204 and the audio pulse 208 is obtained. The mixer 328 output 338 is provided to one or more band pass filters 332. The band pass filter 332 remove frequencies outside of an expected window of frequencies. The filtering provided by the band pass filter 332 may be varied depending on the mode in which the system 100 is operating. For example, a first window of frequencies corresponding to the expected Doppler shift of the return radio frequency signal as the result of the reflection of radio frequency energy 204 by an audio pulse 208 may be used when the system is in a wind measurement mode. A second window of frequencies, corresponding to the expected Doppler shift of the radio frequency energy 204 returned by precipitation may be allowed to pass when the system 100 is used to measure precipitation. As can be appreciated by one of skill in the art, multiple band pass filters 332 may be provided. For example, first and second band pass filters 332 may both be provided with the output signal 338 from the mixer 328. The first filter 332 may remove frequencies outside of a window corresponding to the Doppler shift expected as a result of measuring the wind. The second filter 332 may remove frequencies outside of a window corresponding to the Doppler shift expected as a result of precipitation. The band pass filter or filters 332 may, in accordance with an embodiment of the present invention, be combined with an amplifier, or an amplifier may be interposed between the output of the mixer 328 and the input of the band pass filter 332 or filters, to increase the signal strength of the output signal 338 provided by the mixer 328.

The filtered signal 342 output by the band pass filter or filters 332 may then be converted to a digital signal 346 by a high speed analog-to-digital converter 336. Alternatively, the output 342 of the band pass filter or filters 332 may be provided to a phase-locked loop 340, the output 350 of which is a logic level pulse train synchronized with the mean frequency of the Doppler signal. The use of a phase-locked loop 340 may be advantageous to improve the immunity of the system to noise, particularly where a small number of measurements are made.

The output 346 from the analog to digital converter 336 (or the output 350 from the phase-locked loop 340) is then provided to the microcontroller 304. Where a digital signal 346 is received from the analog to digital converter 336, the microcontroller 304 performs a Fourier Transform analysis to isolate the frequency of the Doppler return signal. When a pulse train 350 is received from a phase-locked loop 340, the frequency of the pulse train 350 is equal to the frequency of the Doppler return signal. The Doppler frequency is then used to compute wind data. When the system 100 is used in a precipitation measurement mode, the measured Doppler frequencies extracted from signal 346 or 350 are used to compute precipitation data. The amplitude of the signal 342 or 346 may also be used alone or in conjunction with frequency data to measure precipitation or wind parameters.

As can be appreciated, the accuracy of the system 100 can be improved by averaging a series of measurements to increase the signal to noise ratio of the system 100. When three or more antennas 104 are used in order to measure the wind, the Doppler frequencies or amplitudes measured with respect to each of the antennas 104 may be used by the microcontroller 304 to compute the direction of the wind, in addition to its speed. Furthermore, a wind profile may be generated by taking measurements at a number of different altitudes, as will be described in greater detail below.

The audio section 310 of the system 100 includes a digital to analog converter 344. The digital to analog converter 344 receives a digital representation of a selected audio frequency 354 from the microcontroller 304, and converts that digital signal to an analog signal 358. The analog audio frequency signal 358 is then provided to an amplifier 348, and the amplified audio frequency signal 362 is in turn provided to the audio transducer 108 for transmission as an audio signal pulse 208.

In order to determine the local speed of sound, and therefore the audio frequency required in order to provide an audio frequency pulse of energy having a wavelength that is approximately one-half the wavelength of the radio frequency signal produced by the audio section 310, various sensors 352 may be provided, either as part of the system 100 or as part of other instruments comprising a meteorological station with which the system 100 is associated. Such sensors 352 may include free air temperature and humidity sensors. An analog to digital converter 356 may be provided for converting analog signals from the sensors 352 to digital signals that are provided to the microcontroller 304. The microcontroller 304 can then use the digital signals to calculate the audio frequency required to produce a pulse of audio frequency energy 208 having a wavelength that is one-half or about one-half the wavelength of the radio frequency energy 204 at the ambient temperature or the ambient temperature and humidity. In accordance with another embodiment of the present invention, the sensors 352 comprise audio transducers separated by a known distance that may be used to determine the time required for an audio pulse to travel from a transmitting audio transducer to a receiving audio transducer, allowing a direct measurement of the speed of sound.

As can be appreciated, various alternative configurations of the system 100 may also be used in accordance with embodiments of the present invention. For example, the functions of a band pass filter or filters 332, and phase-locked loop 340 may be implemented by algorithms running on the microcontroller 304.

Figure 4:
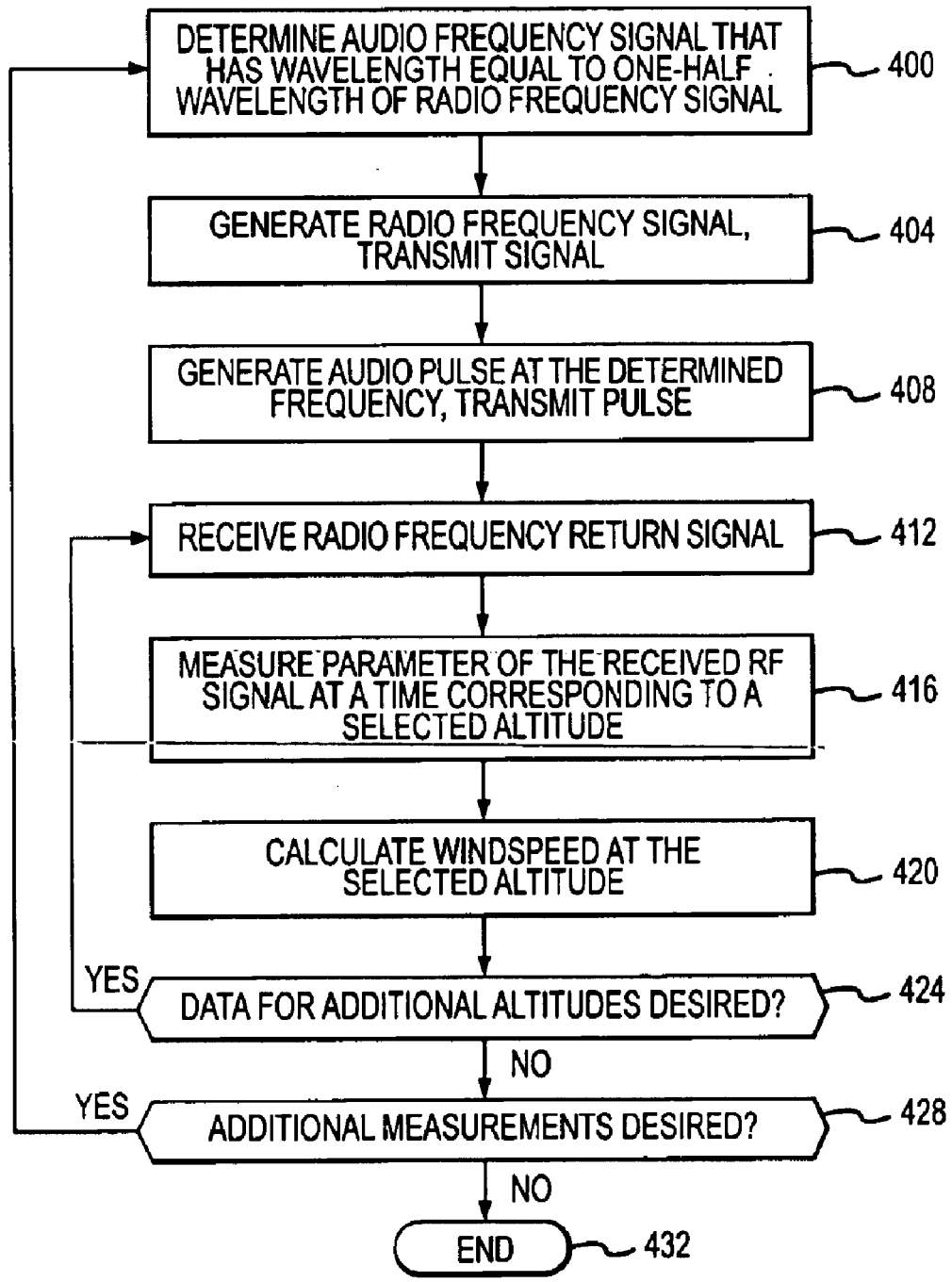
FIG. 4 is a flow chart depicting a method for measuring wind speed in accordance with an embodiment of the present invention.

With reference now to FIG. 4, the operation of a system 100 capable of sensing wind speed is depicted. Initially, at step 400, the audio frequency having a wavelength equal to or about equal to one-half the wavelength of a selected radio frequency is determined. This determination may be made by providing local temperature data from a sensor 352 to the microcontroller 304 and calculating the speed of sound at the sensed temperature. In order to increase the precision with which the calculation of the local speed of sound is made, the microcontroller 304 may also be provided with data from sensors 352 measuring humidity in order to compute a virtual temperature. From the calculated speed of sound, the required wavelength can be determined. A separate speed of sound sensor 352 comprising audio transducers separated by a known distance, and using the time of flight of an audio pulse between those transducers, may also be used for a direct measurement of the speed of sound from which the required wavelength may be determined.

At step 404, a radio frequency signal 322a is generated and transmitted over a volume 204 that intersects the volume through which the audio signal pulse 208 travels. The radio frequency signal may be generated by providing a signal at the desired frequency from an oscillator 312 to a radio frequency amplifier 320 that is provided to an antenna 104. In accordance with embodiments of the present invention, the radio frequency signal may be continuous, at least during the duration of the travel of the audio pulse transmitted at step 408 through an altitude or altitudes from which data is desired.

At step 408, an audio signal pulse 208 is transmitted at the selected frequency. In accordance with an embodiment utilizing only a single radio frequency volume 204, the audio signal pulse 208 is transmitted along a path that is substantially parallel to the radio frequency beam 204. As noted above, the transmission of the audio signal pulse 208 may be effected by synthesizing the desired audio frequency in digital form in the microcontroller 304, and transmitting the digital signal to the digital to analog converter 344. The output of the digital to analog converter 304 (i.e. an analog signal at the selected audio frequency) may then be amplified by an amplifier 348 and transmitted by the audio transducer 108.

At step 412, a reflected or return radio frequency signal is received. In particular, at least a portion of the radio frequency signal transmitted at step 404 is reflected by the audio signal pulse 208 and is received at the antenna 104. The received return signal is provided to the variable gain amplifier 330 by the circulator 325 (see FIG. 3A), by the 90° hybrid 324 (see FIG. 3B), or directly by the receiving antenna 104 (see FIG. 3C), mixed by the mixer 328 and filtered in the band pass filter 332, to obtain the relevant Doppler frequencies.

At step 416, a parameter of the received radio frequency signal is measured at a time that corresponds to a selected altitude. At step 420, the wind speed at the selected altitude is calculated, for example from the observed Doppler shift. In an additional or alternative embodiment, the amplitude of the return signal is monitored. The amount by which the amplitude of the reflected signal is reduced as compared to the expected amplitude in the absence of wind can then be used as the basis for calculating the wind speed at the selected altitude.

At step 424, a determination is made as to whether data for additional altitudes is desired. If measurements from higher altitudes are desired, the system returns to step 412, where the reflected radio frequency signal is received and a parameter of that received signal is measured at a time corresponding to the selected altitude (step 416). The wind speed for the next (higher) selected altitude is then calculated (step 420). Accordingly, as can be appreciated, a number of measurements of wind speed can be made as an audio frequency pulse travels upwardly.

If at step 424 it is determined that data for additional altitudes from the audio pulse is not desired, for example because the maximum desired altitude has been reached, or the maximum effective altitude of the system 100 has been exceeded, a determination is made as to whether additional measurements are desired (step 428). If additional measurements are desired, the system returns to step 400 to repeat the process. If additional measurements are not desired, the process ends (step 432).

Figure 5:
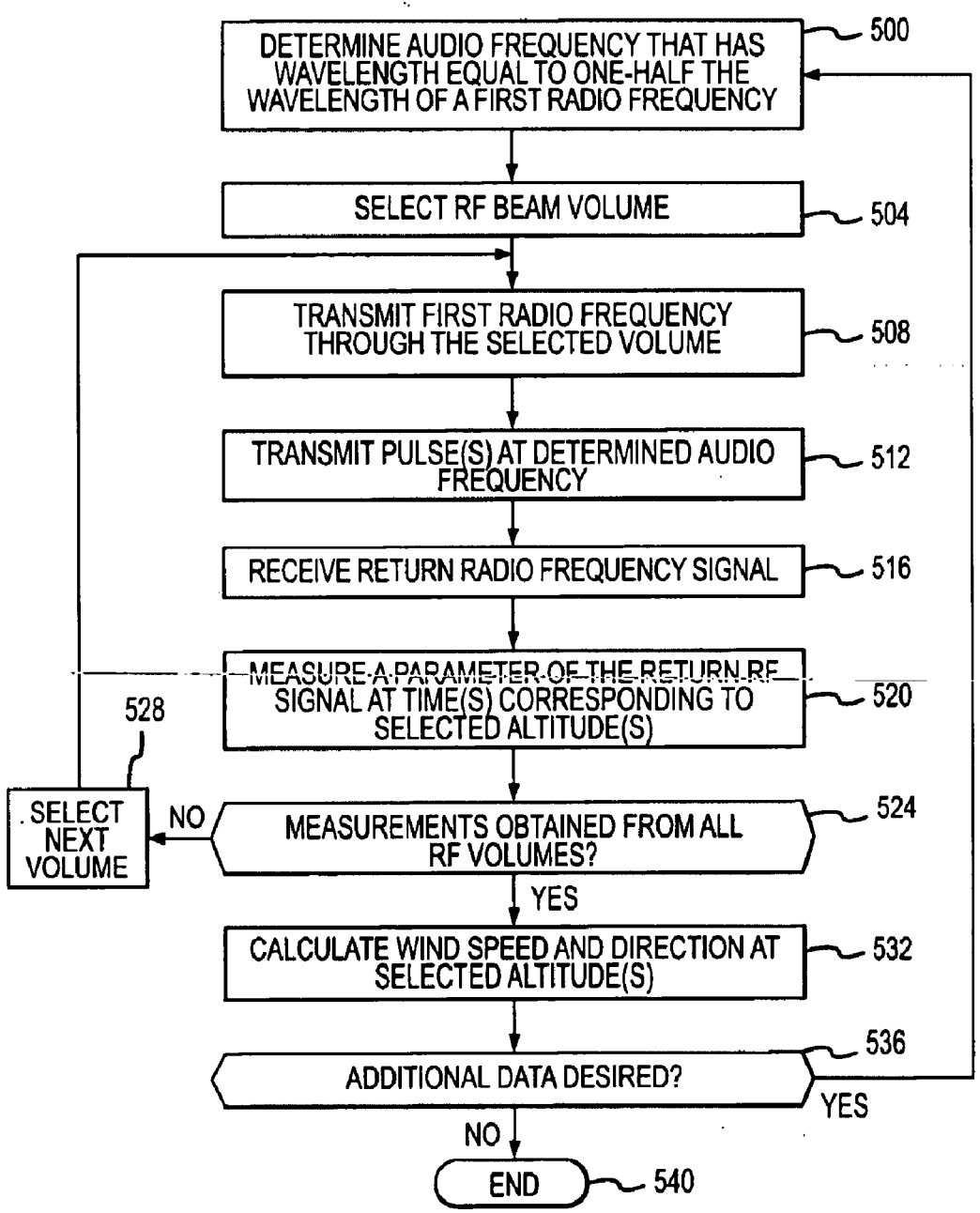
FIG. 5 is a flow chart depicting a method for determining wind speed and direction in accordance with an embodiment of the present invention.

With reference now to FIG. 5, a flow chart depicting the operation of another embodiment of a system 100 in accordance with the present invention is illustrated. Initially, at step 500, the audio frequency that has a wavelength equal to or about equal to one-half the wavelength of a first radio frequency is determined. As described above, the required audio frequency can be calculated by the microcontroller 304 based on inputs received from sensors 352. At step 504, a radio frequency volume is selected. For example, the microcontroller 304 may select a radio frequency volume 204 by operating the PIN diode switches 316 to select the antenna 104 corresponding to the selected audio frequency volume 204.

At step 508, the first radio frequency is transmitted through the selected radio frequency volume 204. In accordance with embodiments of the present invention, the first radio frequency may be transmitted continuously over at least a period of time required for an audio signal pulse or pulses 208 (see step 512) to travel through an altitude or altitudes from which data is desired. Next, at step 512, a physical pulse or series of physical pulses (i.e. audio signal pulses) is transmitted at the determined audio frequency. As described above, the determined audio frequency may be synthesized by the microcontroller 304, converted to analog form by the digital to analog converter 344, and amplified by the amplifier 348 before being transmitted by the audio transducer 108. In order to improve the signal to noise ratio of the system 100, a series of audio signal pulses may be transmitted, and measurements taken with respect to each. Therefore, step 512 may comprise generating a series of audio signal pulses separated in time such that return signals are received with respect to only one audio signal pulse during a measurement.

At step 516, a return radio frequency signal is received. As described above, the received radio frequency signal is processed and provided to the microcontroller 304. At step 520, a parameter of the return radio frequency signal is measured or analyzed at times corresponding to selected altitudes.

At step 524, a determination is made as to whether measurements have been obtained from all of the available radio frequency volumes 204. If no, a next radio frequency volume 204 is selected (step 528) and the system returns to step 508. If measurements have been obtained from all of the radio frequency volumes 204, the wind speed and direction is calculated at selected altitudes (step 532). At step 536, a determination is made as to whether additional data is desired. If additional data is desired, the system returns to step 500. If no additional data is desired, the operation ends (step 540).

In order to calculate the wind speed and direction at a selected altitude, data obtained at a selected period of time following the transmission of an audio signal pulse 208, and thus corresponding to a selected altitude, is analyzed. In particular, vector math may be used to compute the wind speed and direction at the selected altitude from the Doppler signal measurements. By repeating this procedure for a number of altitudes, a wind profile may be obtained. Where extreme wind distortions are occurring close to the surface, the audio signal pulse 208 may be moved in space so that the assumed geometry of the system 100 will not apply. For example, an initial gust of wind close to the surface could appear to offset the location of the audio transducer 108, in which case the vector calculation of the wind based on the Doppler returns at the selected altitude may be in error. In such a case, the error can be reduced by integrating the wind profile from the surface upward, and at each step accounting for the apparent new location of the audio source as the audio signal pulse 208 is moved by the wind. In addition, such an approach can provide accurate wind speed and direction data for all altitudes, and in particular altitudes that are some distance from the audio transducer 108.

In addition or as an alternative to calculating wind speed and direction by monitoring the Doppler shift of a return radio frequency signal, the amplitude of return radio frequency signals at times corresponding to a selected altitude can be monitored. Assuming that the audio signal pulse 208 is transmitted along a path that places it equally in all three volumes 204 of a three antenna 104 system 100, in the absence of wind, each antenna 104 will receive an equal amplitude return signal. In the presence of wind, as the wind blows the audio signal pulse 208 away from its nominal direction of travel, the audio signal pulse 208 will be unequally distributed among the illuminated volumes 204 of the antennas 104. This unequal distribution will result in different return signal amplitudes at each of the transceivers 318, from which the wind direction and speed can be computed. In order to increase the signal to noise ratio of these measurements, a series of such measurements can be made and the results averaged. An embodiment that did not monitor the Doppler shift experienced by a signal would not need a phase-locked loop 340.

The short wavelengths used in connection with the radio frequency transceivers of the present invention are easily scattered by precipitation. Therefore, it is possible to use any of the radio radar transceivers of the system 100 to receive a radar return from falling precipitation. The amplitude of the return signal may be related to the quantity of precipitation present in the air, as well as the precipitation rate. Furthermore, a vertically aligned radio frequency volume 204 (i.e. a vertical radar channel) can be used to determine fall velocities of the precipitation particles. In particular, by conducting a Fourier Transform on Doppler shift data gathered over time in connection with the vertical radar channel 204a, such data can be calculated. Because the fall velocities of precipitation, and thus the Doppler frequencies, are much lower than the velocities of sound waves, the band pass filter 332 may apply a different filter scheme when the system 100 is in a precipitation measurement mode, as compared to when the system 100 is in a wind measurement mode. In embodiments in which multiple band pass filters 332 are provided, the signal from a filter 332 that is designed for passing frequencies associated with precipitation may be used in connection with precipitation measurements.

Figure 6:
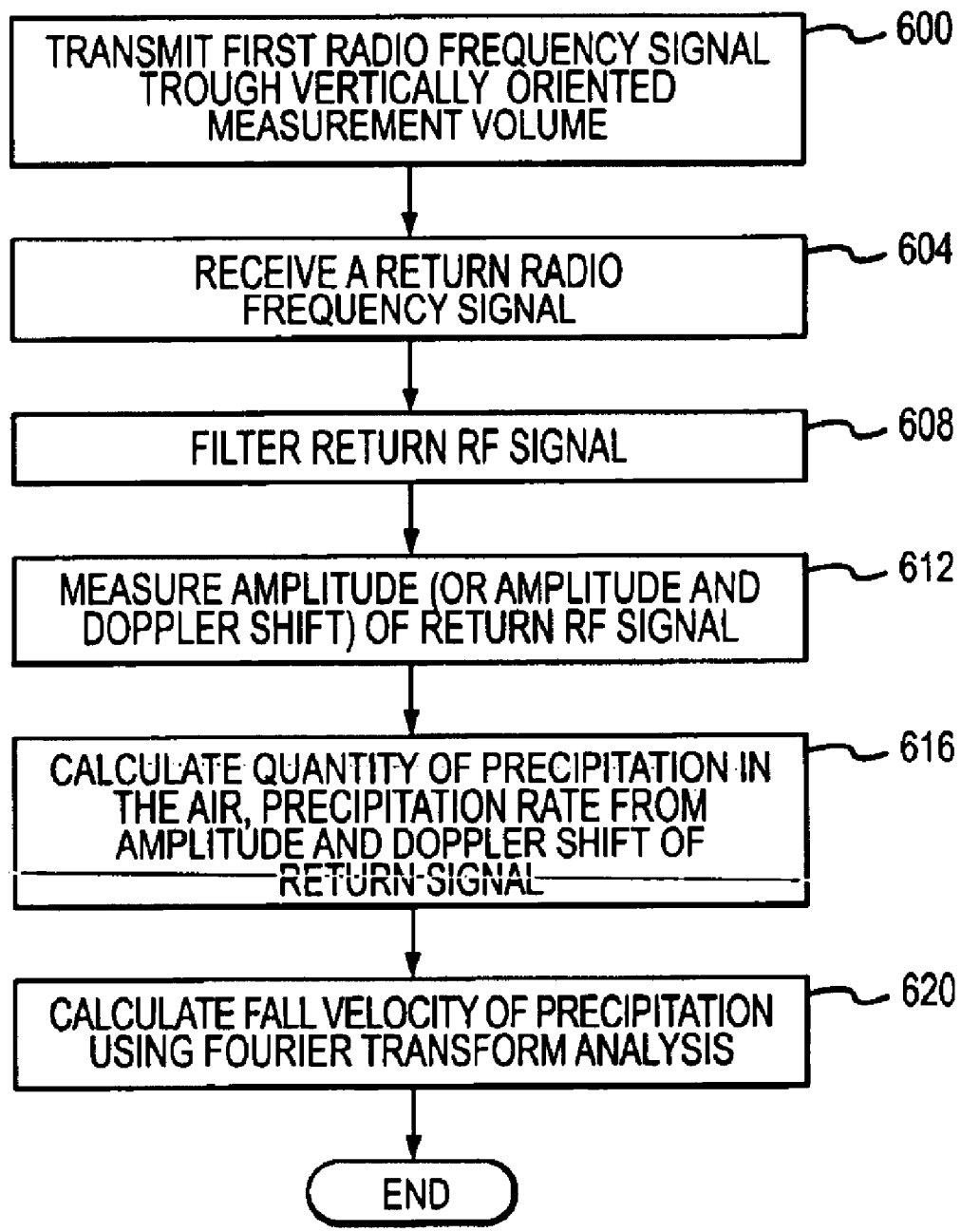
FIG. 6 is a flow chart depicting a method for measuring precipitation in accordance with an embodiment of the present invention.

With reference now to FIG. 6, a flow chart depicting the operation of an embodiment of a system 100 in accordance with the present invention in a precipitation measurement mode is illustrated. Initially, at step 600, a first radio frequency signal is transmitted through a vertically oriented measurement volume. At step 604, a return radio frequency signal is received. The return radio frequency signal 326 received is passed to the band pass filter 332, and frequencies outside of an expected range of frequencies resulting from interaction of the radio frequency energy with precipitation in the atmosphere are filtered (step 608) from the signal. The radio frequency return signal 326 may be provided to the band pass filter 332 using a power divider 323, circulator 325, variable gain amplifier 330, and mixer 328 arrangement as described above in connection with FIG. 3A. The radio frequency signal 326 may alternatively be provided to the band pass filter 332 using a hybrid 324, variable gain amplifier 330, and mixer 328 arrangement as described above in connection with FIG. 3B. The radio frequency signal 326 may also be provided to the band pass filter 332 using a variable gain amplifier 330 and a mixer 328 arrangement as described above in connection with FIG. 3C.

At step 612, the amplitude (or amplitude and Doppler shift(s)) of the return radio frequency signal is measured. From the amplitude and Doppler shift(s) of the return radio frequency signal, the quantity of precipitation in the air and the precipitation rate can be calculated (step 616). Using Fourier Transform analysis of the received signal, the fall velocity of precipitation can be calculated (step 620). Alternatively, if a phase-locked loop 340 is used in place of a digital to analog converter 336, the average fall velocity of the precipitation can be determined from the frequency of the pulse train 350 provided to the microcontroller 304 by the phase-locked loop 340.

In accordance with still other embodiments of the present invention, a separate audio transducer 108 may be provided in connection with each radio frequency volume 204. In such an embodiment, the audio signal pulse produced by a given audio transducer 108 would be aligned to travel over a volume that was aligned with (i.e. has a major axis that is parallel to) a major axis of the radio frequency volume 204. Furthermore, audio transducers 108 that are intentionally misaligned with respect to one or more radio frequency volumes 204 may be provided. Such a configuration would allow accurate wind speed measurements to be obtained even in the presence of winds having speeds high enough to blow an audio signal pulse from a transducer configured to send the audio signal pulse through the center of the radio frequency volumes 204 out of the volumes 204.

In addition to the use of end fire antennas, various other antenna configurations may be used. For example, phased array and Vivaldi antennas could be used. Furthermore, a system that provided for the illumination of multiple volumes 204 with radio frequency energy could be provided using a single mechanically steerable antenna 104, or using a phased array antenna 104 capable of electronically steering the antenna beam.

As is well known, scattering of an electromagnetic wave occurs when an electromagnetic wave is incident upon a physical wave, such as an audio or sound wave, having a wavelength that is one-half the wavelength of the radio frequency energy. Accordingly, audio frequencies of from about 18 kHz to 25 kHz may be generated in the atmosphere to provide a reflector for electromagnetic energy having a frequency of greater than 9 GHz.

According to a further embodiment of the present invention, the local velocity of sound may be calculated by generating an audio frequency signal in a transmitter, and measuring the amount of time required for the audio signal to be received at an audio frequency receiver located a known distance from the transmitter. In this way, the local speed of sound can be calculated directly.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments to the extent permitted by the prior art.

We claim:

1. A system for measuring atmospheric conditions, comprising:

a first radio frequency antenna, operable to transmit at least a first transmitted radio frequency signal and to receive at least a first reflected radio frequency signal with respect to a first volume;

a radio frequency signal generator interconnected to said first radio frequency antenna and operable to generate said at least a first transmitted radio frequency signal, said at least a first transmitted radio frequency signal having a first frequency and a first wavelength, wherein said first wavelength is no more than about 4 cm;

at least a first acoustic transducer, operable to generate at least a first audio signal pulse within a range of frequencies over a volume that at least partially intersects said first volume, said range of frequencies including a second frequency such that said first audio signal pulse has a second wavelength that is about equal to one-half said first wavelength, wherein said at least a first audio signal pulse reflects said at least a first transmitted radio frequency signal as said at least a first reflected radio frequency signal; and a processor, in operative communication with said signal generator and acoustic transducer, wherein at least a first parameter related to said at least a first reflected radio frequency signal received by said first radio frequency antenna and provided to said processor is used to calculate an atmospheric condition.

2. The system of claim 1, wherein a position of said first radio frequency antenna relative to a position of said acoustic transducer is fixed.

3. The system of claim 1, wherein said first radio frequency antenna produces a broad radiation pattern.

4. The system of claim 1, wherein said first radio frequency antenna comprises a tapered slot antenna.

5. The system of claim 1, wherein said first radio frequency antenna comprises a first radio frequency transmission antenna and a first radio frequency reception antenna, and wherein said first radio frequency transmission antenna is adjacent said first radio frequency reception antenna.

6. The system of claim 1, wherein said atmospheric condition comprises at least one of a wind speed and a parameter related to precipitation.

7. The system of claim 1, further comprising: a second radio frequency antenna, operable to transmit at least a second transmitted radio frequency signal and receive at least a second reflected radio frequency signal with respect to a second volume;

a third radio frequency antenna, operable to transmit at least a third transmitted radio frequency signal and receive at least a third reflected radio frequency signal with respect to a third volume, wherein said signal generated by said acoustic transducer travels through at least portions of each of said first, second and third volumes, and wherein said first, second and third radio frequency signals have about the same frequency.

8. The system of claim 7, further comprising multiple acoustic transducers, wherein each of said acoustic transducers is operable to generate audio pulses traveling in different directions.

9. The system of claim 7, further comprising:

a switch controlled by said processor and operable to selectively interconnect one of said first, second and third radio frequency antennas to said radio frequency signal generator.

10. The system of claim 7, wherein said first, second and third volumes at least partially overlap one another.

11. The system of claim 7, wherein each of said first, second and third volumes are spaced apart from one another.

12. The system of claim 7, wherein each of said first, second and third antennae comprises a radio frequency transmission antenna and a radio frequency reception antenna, and wherein said first, second and third radio frequency transmission antennae are adjacent said first, second and third radio frequency reception antennae.

13. The system of claim 1, further comprising:

a temperature sensor, wherein said processor is provided with a signal from said temperature sensor to calculate said second frequency.

14. The system of claim 1, further comprising:

an audio signal receiver, wherein a time required for an audio signal to arrive at said audio signal receiver from at least one of said first acoustic transducer and a second acoustic transducer is used to determine a speed of sound and to calculate said second frequency.

15. The system of claim 1, further comprising:

a power divider;

a circulator interconnected to said power divider and to said first radio frequency antenna; and an amplifier interconnected to said circulator, wherein a received radio frequency signal is amplified.

16. The system of claim 15, further comprising:

a mixer interconnected to said power divider and to said amplifier.

17. The system of claim 1, further comprising:

a 90° hybrid interconnected to said first radio frequency antenna;

an amplifier interconnected to said 90° hybrid, wherein a received radio frequency signal is amplified.

18. The system of claim 17, further comprising:

a mixer interconnected to said 90° hybrid and to said amplifier.

19. The system of claim 5, further comprising:

a power divider interconnected to said first radio frequency transmission antenna; and a variable gain amplifier interconnected to said first radio frequency reception antenna, wherein a received radio frequency signal is amplified.

20. A method of measuring wind speed, comprising:

determining a local velocity of sound;

determining an audio frequency having a wavelength equal to about one-half a wavelength of a radio frequency signal having a first frequency;

generating a first radio frequency signal having said first frequency;

transmitting said first radio frequency signal from a first antenna;

generating a first audio signal having said determined audio frequency;

transmitting said first audio signal from a first audio transducer, wherein said first radio frequency signal is reflected by said audio signal to form a first return radio frequency signal;

receiving said first return radio frequency signal at said first antenna;

measuring at least a first parameter associated with said first return radio frequency signal; and calculating from said measured at least a first parameter a wind speed.

21. The method of claim 20, further comprising:

generating a second radio frequency signal having said first frequency;

transmitting said second radio frequency signal from a second antenna;

receiving a second return radio frequency signal at said second antenna;

measuring a parameter associated with said second return radio frequency signal;

generating a third radio frequency signal having said first frequency;

transmitting said third radio frequency signal from a third antenna;

receiving a third return radio frequency signal at said third antenna:

measuring a parameter associated with said third return radio frequency signal, wherein said step of calculating comprises calculating from said measured at least a first parameter associated with each of said first, second and third return radio frequency signals a wind speed.

22. The method of claim 21, wherein said step of calculating further comprises calculating from said measured at least a first parameter associated with each of said first, second and third return radio frequency signals a wind direction.

23. The method of claim 21, wherein said steps of measuring a parameter associated with said first, second and third return radio frequency signals comprises measuring an amplitude of each of said first, second and third return signals.

24. The method of claim 21, wherein said steps of measuring a parameter associated with said first, second and third return radio frequency signals comprises measuring a frequency of each of said first, second and third return signals.

25. The method of claim 24, wherein said frequency comprises a Doppler frequency.

26. The method of claim 21, wherein said first radio frequency signal is generated during a first time period, wherein said second radio frequency signal is generated during a second time period, and wherein said third radio frequency signal is generated during a third time period.

27. The method of claim 26, wherein said first, second and third time periods do not overlap.

28. The method of claim 20, wherein said step of generating a first audio signal comprises generating a series of pulses of said first audio signal.

29. The method of claim 28, wherein said pulses are spaced in time.

30. The method of claim 29, wherein a series of pulses of said first audio signal are generated, wherein said pulses are separated by one of transmission of said first, second and third radio frequency signals.

31. The method of claim 20, wherein said first audio signal is generated periodically.

32. The method of claim 21, wherein said first radio frequency signal occupies a first volume, wherein said second radio frequency signal occupies a second volume, wherein said third radio frequency signal occupies a third volume, and wherein in the absence of wind said first audio signal travels through a fourth volume that is at least partially coextensive with said first, second and third volumes.

33. The method of claim 32, wherein said first, second, third and fourth volumes have positions that are fixed with respect to one another.

34. The method of claim 20, wherein said first return signal is reflected by said first audio signal at a first altitude.

35. The method of claim 34, wherein said first altitude is related a period of delay between said step of transmitting said first audio signal and receiving reflected energy from said first radio frequency signal.

36. A method of measuring wind speed, comprising:

determining a local velocity of sound;

determining an audio frequency having a wavelength equal to about one-half a wavelength of a radio frequency signal having a first frequency;

generating a first radio frequency signal having said first frequency:

transmitting said first radio frequency signal from a first antenna;

generating a first audio signal having said determined audio frequency;

transmitting said first audio signal from a first audio transducer;

receiving a first return radio frequency signal;

measuring at least a first parameter associated with said first return radio frequency signal;

generating a second radio frequency signal having said first frequency;

transmitting said second radio frequency signal from a second antenna;

receiving a second return radio frequency signal;

measuring at least a first parameter associated with said second return radio frequency signal;

generating a third radio frequency signal having said first frequency;

transmitting said third radio frequency signal from a third antenna;

receiving a third return radio frequency signal;

measuring at least a first parameter associated with said third return radio frequency signal:

calculating from said measured at least a first parameter associated with each of said first, second and third return radio frequency signals a wind speed;

generating a fourth radio frequency signal having one of said first frequency and a second frequency;

receiving a fourth radio frequency return signal; and calculating at least one of a precipitation rate, a quantity of precipitation present in the air, and a precipitation fall velocity.

37. The method of claim 21, further comprising:

generating a fourth radio frequency signal having one of said first frequency and a second frequency;

receiving a fourth return signal;

calculating at least one of a precipitation rate, a quantity of precipitation present in the air, and a precipitation fall velocity.

38. The method of claim 20, wherein said step of determining a local velocity of sound comprises:

measuring an ambient temperature; and calculating a velocity of sound at said measured ambient temperature.

39. The method of claim 38, wherein said step of determining a local velocity of sound further comprises:

measuring an ambient humidity, wherein said step of calculating a velocity of sound comprises calculating said local velocity of sound at said measured ambient temperature and humidity.

40. The method of claim 20, wherein said step of determining a local velocity of sound comprises:

generating at an audio transmitter a second audio signal;

receiving at an audio receiver said second audio signal, wherein said transmitter is a known distance from said receiver; and calculating a velocity of sound from a time required for said second audio signal to travel from said transmitter to said receiver and from said distance between said transmitter and receiver.

41. An apparatus for measuring wind speed at low altitudes, comprising:

first frequency generator means for generating at least a first transmitted signal having a first wavelength, wherein said first transmitted signal comprises a radio frequency signal;

first means for transmitting said first transmitted signal and for receiving a first reflected signal;

second frequency generator means for generating a second transmitted signal having a second wavelength, wherein said second wavelength is about equal to one-half said first wavelength, wherein said second transmitted signal comprises an audio frequency sound energy signal, wherein at least a portion of said first transmitted signal is reflected by said second transmitted signal as said first reflected signal;

means for measuring a parameter associated with said first reflected signal; and means for computing a wind speed from said measured parameter.

42. The method of claim 41, wherein said first frequency is greater than about 7 GHz and said audio frequency has a frequency of from about 18 kHz to about 25 kHz.

43. The method of claim 41, wherein a beamwidth of said first antenna is greater than about 25°.

* * * * *